3,381,822
FLOW CONTROL AND CIRCULATION VALVE
Rand H. Martin, Monterey Park, Calif., assignor to HPE Inc., El Monte, Calif., a corporation of California
Filed May 5, 1965, Ser. No. 453,287
3 Claims. (Cl. 210—169)

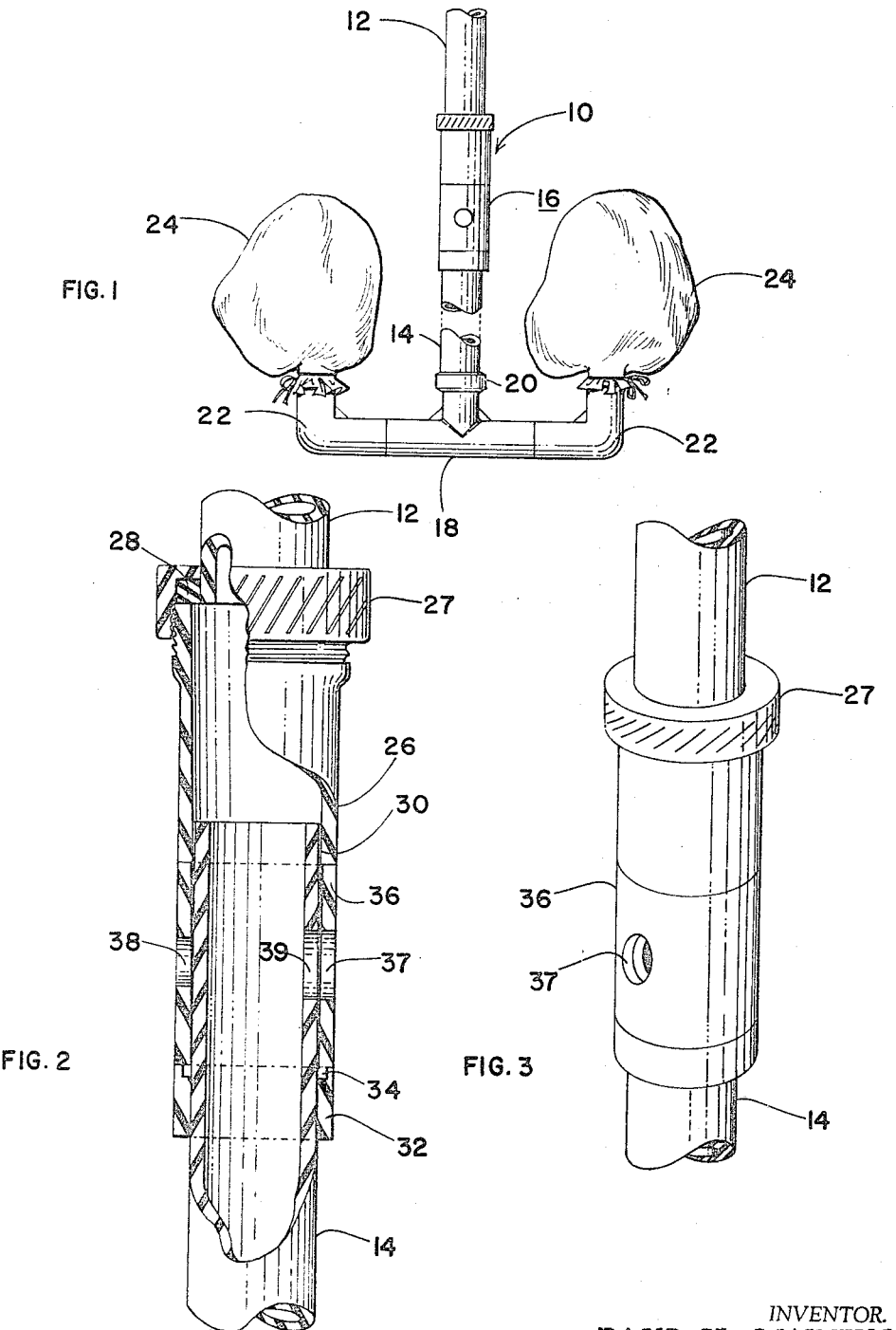

ABSTRACT OF THE DISCLOSURE

A flow control valve for circulating swimming pool water consists of a rotatable sleeve placed over the input line which returns water from the circulating pump to the pool, through filter bags. Aligned ports in sleeve and input pipe permit incoming water to bypass the filter bags and go directly into the pool where a stirring action is created. Rotation of the sleeve closes the bypass ports to direct all of the water through the filter bags before entering the pool.

---

This invention relates broadly to valve devices, and relates more specifically to a combination device for pressure release, jet stirring, and return-line-length adjustment for above-ground swimming pools, having a circulation pump located on the exterior of the pool.

Above-ground type of pools require filtering and chemical treatment if they are of appreciable size, because the cost of filling such pools is excessive, if the water is changed often enough to keep it fresh, and draining for such purposes places the pool out of use for an extensive period of time.

The type of filter employed for such a pool is generally quite different from that of the permanently-installed pool placed into the earth. The above-ground type pools are generally made waterproof by means of plastic liners held within a reinforcing structure. It is generally not a satisfactory matter to provide fluid inlets and outlets from such a liner. Furthermore, space and cost factors generally prohibit a separate filter station removed from the vicinity of the pool.

One type of filter employed for such pools is a flexible bag in which diatomaceous earth is placed inside the bag and forms a filtering media through which the water passes in escaping from the bag.

Such filter bags will remove very finely divided foreign matter. However, as the foreign matter builds up on the filtering media surface, the back pressure needed to force the water through the filter bag becomes greater. Eventually, the bag must be removed and cleaned, and a new filtering media installed.

The capacity of such a filtering system is determined by the surface area available for water filtration. The water must pass relatively slowly through such media, otherwise it would wash away the diatomaceous earth and disrupt the filtering action. Therefore, in the drawing there is shown a double filter-bag system permitting double capacity of water filtration.

In such filtering systems, the water is generally taken out of the pool by means of an inlet pipe which is simply a plastic pipe having a shepherd's crook form, and the end of the pipe projects down into the pool by hanging the crook over the side of the pool.

An electric motor and centrifugal pump is placed on the exterior of the pool and draws the water from the inlet pipe and returns it through a similar return-line pipe. The filter is placed on the return-line pipe and thus the water to be filtered will pass through the filtering media under pressure.

There are two general difficulties encountered in such a system. First, back pressure will generally build up in the filtering bags due to the build-up of material which clogs the filtering media. Secondly, the filtering system is generally employed full time, whether the pool is in use or not. Hence, if the water becomes quiescent due to non-use, it often occurs that the filtered water stays in the vicinity of the filters, and, therefore, begins to feed back into the intake pipe. Hence, the area adjacent the filters becomes well filtered and refiltered. But the water away from the filters remains in its dirty condition until swimmers come to stir the water. This condition is obviously an efficiency defect.

Accordingly, it is an object of this invention to provide a valve and filter system wherein the back pressure on bag filters within the pool may be regulated and relieved according to need.

Another object of this invention is to provide a jet-stirring stream which will cause the entire body of water in the pool to circulate slowly and distribute filtered water while bringing water in need of filtration to the inlet of the pump and filter system.

A still further object of the invention is to combine such relief and directional stirring in a length adjustment fixture, at a nominal increase in price over a system having no relief and stirring action.

A further object of the invention is to combine a filter inside the pool using diatomaceous earth, which filter rejuvenates the coating of diatomaceous earth and recoats the filter septum cloth after a cake of the earth has fallen off due to turning the filtering water pressure off, and due also to the wash action from water when the pool is in use.

In accordance with these and other objects which will become apparent hereinafter, a preferred form of the present invention is disclosed in the accompanying drawing wherein:

FIGURE 1 is a schematic illustration of a filtering system placed within a pool, as viewed in elevation;

FIGURE 2 is an enlarged detail, partly in section, of the combination pressure relief, jet-stirring valve, and return-line length adjustment fixture; and FIGURE 3 is a perspective view of the construction shown in FIGURE 2.

Referring now to the drawings, a return line 10 from an externally-located centrifugal pump is shown as having a first section 12 and a second section 14 with a by-pass selector 16 therebetween.

At the end of the second section 14 is a T-section 18, held on the end of the pipe by means of a cemented joint 20. Cemented on the end of the T-section 18 are lateral elbows 22 fitted with filter bags 24.

The filter bags 24 have internal floats in the top of each bag to keep the floats vertical when the filter is not in use. Thus, when water pressure is turned off, the filter cake will fall off the inside wall to the bottom of the unit and will be picked up again when the water is again filtered through the bags. Thus, there is a renewal or rejuvenation of the diatomaceous earth coating each time the filter system is turned off.

Referring more specifically to FIGURE 2 for details of construction, the section 14 is shown as having an end bell 26, in the form of a separate attached piece. End bell 26 has a nut 27 and packing 28 to grip the end of the first section 12, thereby providing a snug union fit. Note that there is no need for absolute water tightness, but rather the preservation of the pressure essentially undiminished is sufficient.

The end bell 26, in this embodiment of the invention, is cemented to the end of second section 14. Reference character 30 indicates the location of such cement, although there is no attempt to illustrate the actual cement in this view.

A collar 32 is secured a distance from the end of the second section 14 by means of cement. In this illustrated embodiment a relief 34 is provided in order to accept a quantity of fluid cement and hold such cement until it has solidified.

Between the collar 32 and the butt end of the bell 26, a sleeve 36 is loosely journaled over the end of the second section 14 and is free to rotate about its axis, although held firmly against movement longitudinally of the section.

Gate opening 37 and 38 in the sleeve 36 are, therefore, movable around the periphery of the section 14. A lateral vent 39 in section 14 provides an outlet registrable with the gate openings as the sleeve is rotated into position. The opening 37 is larger than the opening 38 in the illustration of the invention, and more such openings and various sizes of such openings may be provided if desired. The vent 39 provides a maximum limitation for water by-pass. An opening through the wall of sleeve 36, larger than the vent 39, would be of no avail. However, smaller openings will limit the amount of water which may escape from the vent 39. Therefore, by providing a plurality of openings in the sleeve 36 and outlet means through the side wall of the section 14, alignable in a variety of combinations with the sleeve openings, there is provided a means for directing a controlled amount of water from the return line directly into the pool as a stirring jet stream and filter by-pass, and also a relief for controlling the back pressure built up within the filters 24.

With the structure, as shown particularly in FIGURE 2, in operation, the valve functions are substantially as follows for directional flow:

(1) With the large opening 37 of the sleeve over the extension tube vent 39, there is adequate filtration and maximum directional flow.

(2) With the small opening 38 of the sleeve over the extension tube vent 39, there is normal filtration and directional flow.

(3) Whenever the sleeve 36 is rotated to close the extension tube vent 39, that is, whenever no openings are in registration with such vent, there is maximum filtration with no direction flow.

While the instant invention has been shown and described herein in what is conceived to be the most practical and preferred embodiments, it is recognized that departures may be made therefrom within the scope of the invention which is, therefore, not to be limited to the details disclosed herein, but is to be afforded the full scope of the invention as hereinafter claimed.

What is claimed is:

1. A combination pressure relief, jet-stirring valve, and return-line length adjustment for an in-pool filter system comprising:
    a return line from an exterior pressure source, said line having a first section from said source to a position within said pool, and a second section extending within said pool to a filter device;
    one of said sections having an enlarged diameter end bell telescoping over the other section, and clamp means to hold the telescoped sections in firm engagement;
    at least one wall opening through said other section adjacent said end bell;
    a sleeve loosely journaled on said other section over said wall openings and having at least two gate openings movable to register with selected ones of said wall openings, one being larger than the other, whereby the quantity and direction of jet flow from said line may be controlled; and
    means spaced along said other section a distance from said end bell to provide a shoulder, said shoulder and bell serving as means to hold said sleeve longitudinally located with respect to said wall openings.

2. In an above-ground swimming pool having a circulating pump located exterior of said pool, an intake line extending into the pool, and a return line to the pool, the provision of a combination filter and stirring device to assure distribution of the clean water and bringing of contaminated water to said intake line, comprising:
    a filter outlet on said return line within said pool;
    said return line having a valve area, a sleeve over said valve area, an opening means in said line under said sleeve; and
    outlet means through the side wall of said sleeve alignable in a variety of combinations with said line opening means for directing a controlled amount of water from said line directly into said pool as a stirring jet stream and filter by-pass.

3. In an above-ground swimming pool having a circulating pump located exterior of said pool, an intake line extending into the pool and a return line to the pool, the provision of a combination filter and stirring device to assure distribution of the clean water and bringing of the contaminated water to said intake line, comprising:
    said return line to the pool having a lateral extension end leading to a filter bag having a float means therein to hold the filter bag upright in the body of water at all times, diatomaceous earth in said bag, said diatomaceous earth being self-rejuvenating by falling away from the bag surface upon cessation of water flow through the filter bag;
    said return line having a valve area, a sleeve over said valve area, a vent opening in said line under said sleeve; and
    said sleeve having at least two outlet openings through the side wall of said sleeve, alignable with said vent opening by rotation of the sleeve, one said opening being substantially equal in size to the vent opening and all other openings being smaller than said vent opening, whereby the by-pass rate from the return line may be controlled to produce a balancing of filtration and directional flow stirring.

References Cited

UNITED STATES PATENTS

| | | | |
|---|---|---|---|
| 1,385,401 | 7/1921 | Stockholder | 251—345 X |
| 1,796,613 | 3/1931 | Nugent | 210—433 X |
| 2,101,014 | 11/1937 | Angelus et al. | 210—196 |
| 2,435,201 | 2/1948 | Cooperider | 210—194 |
| 2,792,943 | 5/1957 | Mackintosh | 210—169 X |
| 2,985,308 | 5/1961 | Koupal | 210—169 |

FOREIGN PATENTS 1,335,720   7/1963   France.

REUBEN FRIEDMAN, *Primary Examiner.*

F. MEDLEY, *Examiner.*